340-825.54 SR
E4819 OR 3,790,721

United States [redacted]
Mühlbauer et al.

[11] 3,790,721
[45] Feb. 5, 1974

[54] AUTOMATIC DIALING DEVICE

[76] Inventors: Heinz Mühlbauer, Erchanastrasse 7, Dachau; Franz Hofstetter, Franz Schellerstrasse 12, Herbertshausen, both of Germany

[22] Filed: June 13, 1972

[21] Appl. No.: 262,230

[52] U.S. Cl. .............................................. 179/90 B
[51] Int. Cl. .............................................. H04m 1/44
[58] Field of Search ...................... 179/90 AN, 90 B

[56] References Cited

UNITED STATES PATENTS

| | | | |
|---|---|---|---|
| 3,670,111 | 6/1972 | Bukosky | 179/90 BD |
| 3,538,256 | 11/1970 | Lucas | 179/90 K |
| 3,686,440 | 8/1972 | Kroeger | 179/90 AN |
| 3,674,941 | 6/1970 | Guetta | 179/90 AN |

FOREIGN PATENTS OR APPLICATIONS

| | | | |
|---|---|---|---|
| 1,036,467 | 6/1963 | Great Britain | 179/90 B |
| 1,110,606 | 6/1965 | Great Britain | 179/90 B |
| 1,093,184 | 10/1965 | Great Britain | 179/90 B |

*Primary Examiner*—Kathleen H. Claffy
*Assistant Examiner*—Brigance
*Attorney, Agent, or Firm*—Shenier & O'Connor

[57] ABSTRACT

Automatic dialing apparatus in which a plurality of storage registers each containing a representation of a directory number are serially interrogated and are read out in response to the concomitant presence of the interrogating signal and actuation of an associated selecting means to produce calling signals and in which the interrogating means is stepped past a selected register when the called number is busy, when the called party does not answer within a certain period of time or when the call is completed.

12 Claims, 1 Drawing Figure

PATENTED FEB 5 1974 3,790,721
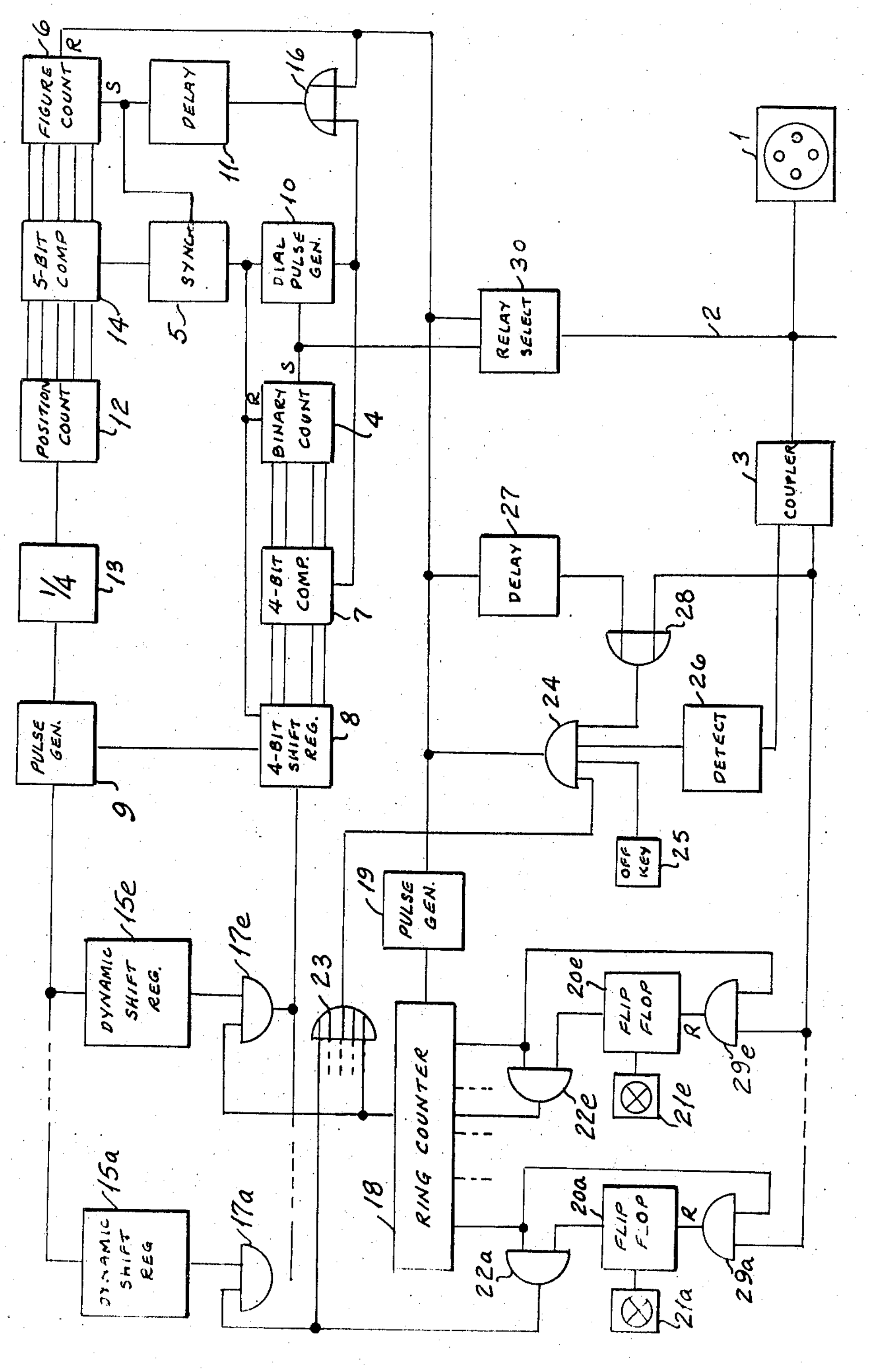

AUTOMATIC DIALING DEVICE

BACKGROUND OF THE INVENTION

Well-known are automatic dialing devices with mechanical storage means for the purpose of automatically establishing direct distance dialing connections, in which devices a certain quantity of directory numbers, for instance fifty directory numbers, can be stored by adjusting stepping wheels, stepping cams, or similar means. Whenever a given directory number is to be transmitted for the purpose of establishing a direct distance dialing connection, then the user looks up this directory number on a control panel and causes its transmission by operating, for instance, a pushbutton associated with the store that contains this directory number. These electromechanical devices require much space and it takes some time to input the directory numbers into the stores: moreover, they have the disadvantage of requiring the user to look up the stored directory number on the control panel and then cause the transmission of this directory number, a disadvantage that is felt particularly acutely whenever a directory number has to be transmitted several times in succession because the called subscriber is busy or for some other reason.

Known also are automatic dialing devices operating on a purely electronic basis, but having only one storage register accommodating not more than one directory number. The directory number is fed into this register by an ordinary dial switch before it is transmitted. Coupled with the register is a device that indicates the directory number fed into the register so that the number stored in the register may be checked for correctness. Only after this check has been completed, the directory number is transmitted by actuation of a control element. Provided is also the capability of repeatedly transmitting the stored directory number, e.g. when the called subscriber is busy. Electronic automatic dialing devices primarily serve the purpose of avoiding wrong connections especially in nation-wide dialing where directory numbers with numerous digits are used. A disadvantage is that the connection has to be disconnected, e.g. a long-distance call conversation has to be completed before this known electronic automatic dialing device can be used to establish a new direct distance dialing connection. This is particularly inconvenient when a toll line is unavailable or the called subscriber is busy and the time till a new attempt to establish this connection could actually be used to establish another connection.

SUMMARY OF THE INVENTION

The said disadvantages of known automatic dialing system are avoided in an electronic automatic dialing device not belonging to the state of the art and suggested by the applicant hereof. This device has several registers, each capable of storing a directory number and addressable for readout and capable of receiving a directory number from a conventional dial switch or similar device, while this number is simultaneously being transmitted. This provides a highly flexible combination of directory numbers that may differ as required and as the case may be whenever such directory numbers have not resulted in established connections when they were used for the first time so that their repeated transmission is desirable. It is the objective of this invention to use the suggested automatic dialing device or a comparable device in such a way that the interrogation of the storage registers and transmission of the stored directory numbers requires only a minimum of operating effort and yet to permit varying establishing of direct distance dialing connections as provided by the versatile storage capabilities of the system registers.

Starting out from an automatic dialing device used to establish direct distance dialing connections in communication networks where a manually dialed or selected directory number can be fed into any one of several electronic storage registers and can be read out, as required, to a signal converter that will translate the dialing pulses into signals suitable for establishing the desired connection, this operation is provided, according to this invention, by associating with the said registers an interrogating device switchable step by step for the purpose of sequentially connecting one, two, or more registers to the said converter for the said converter operation and by associating with the interrogating device (interrogator) a detector circuit capable of detecting the busy signal used in any one of the said communication networks in such a way that the detector will trigger the interrogator whenever it has detected a busy signal.

In the automatic dialing system according to this invention, there is no necessity for the user to spend time and effort for looking up any one of the stored directory numbers, triggering its transmission, and checking whether or not the desired connection is established. In the system according to this invention, only a simply accomplished stepping of the interrogator is necessary. Moreover, the said detector ensures the stepping of the interrogator only whenever a conversation has been completed, or a busy signal is detected. In those cases,becoming more and more frequent especially in telephone traffic, namely, where the toll lines or the called subscriber are busy or unavailable, the detector will automatically step the interrogator to the next register. The use of the busy signal instead of, say, the proceed-to-dial signal as a criterion for the stepping operation carries the special advantage that the device will correctly operate even in special circumstances, e.g. when a dead subscriber line or an automatic announcement service in telephony is dialed in which cases the proceed-to-dial signal is absent or very short, respectively. This system will satisfactorily operate even in international direct distance dialing where no busy signal detectable by the detector occurs although, in this case, the user should recognize the foreign busy signal and manually step the interrogator. For reliability of detection, the busy signal is again more suitable than other signals because it is repeated several times. The schematic stepping to all the registers in a sequence or cycle has the additional advantage that none of the directory numbers to be repeated in new attempts to establish a connection can be forgotten by some mistake. The device reliably tries each waiting directory number in each cycle.

In a preferred extended embodiment of the invention, the user may simply operate a key to define those registers to be scanned by the interrogator. This extended embodiment is characterized by the interrogator comprising a ring counter having as many counting positions as there are registers where each counting position has several associated outputs and each register has an associated flip-flop that can be reversed by manual operation of an operating pushbutton while every output of a flip-flop is connected to one output of the ring counter with the aid of an AND gate, the output signal of which serves to control the selection of the register associated with the flip-flop in question. In this extended embodiment, the ring counter is the actual steppable element. Operating the pushbuttons, the user sets those flip-flops that are associated with the registers to be interrogated. As soon as the output signal of a set flip-flop coincides with the output signal corresponding to a certain counting position of the ring counter, the register associated with the set flip-flop is driven into read-out of its content to the converter, whereupon the converter outputs, in automatic operation, the calling signal corresponding to the stored directory number. For the reset flip-flops, no coincidence comes into being and therefore no readout of the content of the associated registers takes place. In order to show the user which of the registers are being interrogated, the operating push-buttons can be associated, for instance, with signal lamps that glow or do not glow, depending on the position of the associated flip-flops.

In the extended embodiment just described, operation by the user can further be simplified by automatic stepping of the interrogator and the ring counter. This is accomplished by a ring counter connected to a stepping-pulse generator and feeding the output signals of the AND gates via an OR gate to the input of an additional AND gate, the second input of which receives a negative-going signal from the detector whenever a busy signal is detected and the output signal of which serves to block the supply of stepping pulses to the ring counter. The ring counter is therefore automatically stepped by the stepping-pulse generator as long as the second AND gate provides no output signal. This output signal can come into being only when coincidence between a flip-flop output and a ring-counter output occurs, as determined by the OR gate. Thus simple means serve to achieve that the interrogator does not unnecessarily stop at those registers which the user does not want to be read out. The renewed stepping of the interrogator by a recognized busy signal is again solved in the simplest way in this embodiment by feeding a negative-going signal, whenever the busy signal is detected, to the second input of the additional AND gate. Should this signal caused by the busy signal fail to appear, then the output signal of the additional AND gate will likewise disappear so that the ring counter again receives stepping pulses and is further set. Blocking of the stepping pulses to the ring counter can be achieved, for instance, by using a pulse generator that can be switched off with the aid of a bias voltage, for which purpose the output signal of the additional AND gate can be used.

Otherwise the additional gate offers a simple way of realizing additional automatic dialing functions simplifying its operation by the user. Thus, for instance, the interrogator can be stepped at will very simply by a bias voltage that can be adjusted manually, e.g., with a pushbutton switch and that is applied to a third input of the additional AND gate. As long as the bias voltage is switched off, the additional AND gate cannot produce an output signal and the ring counter is stepped in spite of a coincidence that may have occurred. To prevent a connection to a subscriber that does not lift the handset from being occupied for too long a period, it is further possible to provide a triggerable time network, e.g. a monoflop, that can be triggered by the output signal of the additional AND gate and will interrupt for a short time, after the preset time has run out, a preparatory signal applied to a fourth input of the additional AND gate. In the simplest case, the preparatory signal is the output signal of the time network that is pulse-like switched off after the preset time has run out. Switching off and interruption causes the output signal of the additional AND gate to disappear and the ring counter to be stepped to a coincidence associated with another register. In the telephone traffic, a delay time of 10 to 40 seconds for the time network has been found satisfactory. A continuous call is thus released not later than 40 seconds. To prevent established connections from being released in the same way, the preparatory signal can be fed to the additional AND gate via an OR gate through which the additional AND gate receives a signal signaling a telephone set in operation, e.g. handset lifted, that will override the disconnection of the preparatory pulse as caused by the time network.

In the case of the initially described automatic calling system as suggested by the inventor, the registers are incorporated in the form of preferably dynamic shift registers in which directory numbers can be stored in binary coded form. Dynamic shift registers are available at very low cost in the form of self-contained components in completely integrated form that permit anybody versed in the art to exploit the advantages of integrated circuits known to experts in the field, namely, low space requirement, high operating speed, and high reliability in operation. When dynamic shift registers are used as storage registers, a particular useful embodiment of the invention can be had if the converter that contains the content of the interrogated register comprises series-to-parallel converters that can be coupled to the registers as well as a binary counter that can be stepped by a dial-pulse generator and if a comparator is inserted between the outputs of these so that the coincidence pulse of the comparator can be used to stop the dial-pulse generator that was started by the output signal of the additional AND gate. Here relatively simple means serve to achieve the conversion of the content of shift registers, read-out with the relatively high timing frequency, into the relatively slow calling signal, composed of dialing pulses, at the same time providing the necessary code conversion. To initiate the conversion, it is advantageous to use the output signal of the additional AND gate that goes back to a coincidence achieved between the output of a flip-flop and an output of the ring counter.

To separate the busy tone from the signal mixture existing on the subscriber line, various conventional means may be employed. Preferred is a detector circuit that may comprise a possibly active bandpass filter network and delay lines adjusted to the pulse duration and interval of the busy signal to be detected. The duplicated checking of the frequency and shape of the busy signal ensures a high reliability of detection.

BRIEF DESCRIPTION OF THE DRAWING

In the accompanying drawing which forms part of the instant specification and which is to be read in conjunction therewith the FIGURE is a schematic view of the automatic dialing system.

DESCRIPTION OF THE PREFERRED EMBODIMENT

The following is a description of an embodiment of the invention with additional advantageous details illustrated by the attached block diagram. This embodiment refers to the establishment of telephone connections. All embodiments are, of course, also claimed for the establishment of Telex and other communication connections.

The automatic dialing system shown as an example of an embodiment is connected to a telephone set 1 of conventional design via the trunk line 2. The telephone set 1 has the conventional dial switch for the purpose of dialing-in the directory number of the called subscriber, generating a calling signal in the form of series of digit pulses in accordance with a counting code and feeding it to the trunk line 2. In other words: for each figure dialed, that number of pulses identical with the figure dialed is generated with a fixed duty cycle. A certain interval is maintained between the pulse series associated with each figure so that the individual figures can be discerned. This interval is normally 1 second and is achieved by the necessity of winding up the dial switch when the figures are dialed. Of course, the automatic dialing system has to generate calling signals of the same composition.

To store the calling numbers to be transmitted, the system has five registers 15 a through e. Each register will accommodate any directory number chosen by the user. The means for inputting of directory numbers are not the subject of this invention and therefore not shown. Preferably, however, as described in our copending application, Ser. No. 262,231, filed June 13, 1972, for Automatic Dialing System, they comprise a buffer register that will automatically accept a number dialed with the subscriber set 1 and at the same time transmitted, from which buffer register the stored directory number can be transferred, when the dialing process is complete, into any one register selected as desired. Each of the registers 15 a through e is a dynamic shift register and all of them receive timing pulses causing continuous recirculation of their content from a common timing-pulse generator 9. In the shift registers, the directory numbers are stored in binary coded form with four bits per decimal digit. Associated with each register 15 is an AND gate 17 a through e and one of the gate inputs permanently contains the register content. When a readout signal is fed to the other input of the AND gate, the content of the associated register is transferred to an output line common to all registers and leading to a converter.

The converter has a series-to-parallel converter in its input circuit'. This is a four-bit shift register that can be changed over from serial to parallel operation and obtains timing pulses from the timing generator 9 just as the registers do so that it is stepped, in serial operation, synchronously with the registers 15. A synchronizing pulse from a synchronizing circuit 5 serves to changeover the four-bit shift register that normally operates in the parallel mode. The sync pulse has the duration of four timing clock pulses and has the effect that a binary signal distributed among four certain dynamic positions of the register or shift register called up for readout and corresponding to one figure of a directory number, is serially fed into the four-bit shift register 8. When the sync pulse ceases, the binary signal is applied to the four parallel outputs of the shift register 8.

Moreover, the sync signal is applied to the reset input of a binary counter 4 that also comprises four parallel outputs for a four-digit binary signal indicating the count of the binary counter. Connected to the outputs of the shift register 8 and binary counter 4 is a four-bit comparator 7 that issues a coincidence pulse whenever the contents of the shift register 8 and of the binary counter 4 are identical. The stepping input of the binary counter is connected to the output of a dial-pulse generator 10. The latter generates dial pulses of a duration and frequency equal to the required decimal digit pulses. The dial pulse generator 10 can be switched on by the sync pulse from the synchronizing circuit 5 and can be switched off by the coincidence pulse from the comparator 7. The dial-pulse generator causes the binary counter 4, reset to zero by the sync pulse, to be stepped until its count is identical to the content or the directory-number figure in the four-bit shift register 8. The dial pulse generator then emits a number of dial pulses equal to the said figure. These dial pulses are fed to the binary counter 4 and to a relay selector 30 to cause this relay selector to transmit a figure pulse series to the trunk line 2 corresponding to the figure.

The directory numbers are stored in registers or shift registers 15 by fixed association of each figure (or each decimal digit) of the directory number with four certain dynamic positions of the shift registers. A position counter 12 is provided for addressing or marking the digits in the registers and will operate even while directory numbers are entered into the registers. The position counter 12 is stepped by the timing-pulse generator or "clock" via a frequency divider 13 employing the division ratio 1 : 4 that corresponds to the four-bit or four-binary-digit coding. The number of steps of the position counter 12 is one quarter of the number of steps in the shift register 15 so that both need the same time for one complete cycle. Thus the individual counts of the position counter characterize certain four dynamic positions of the shift registers. The position counter 12 has five parallel outputs in which the instantaneous count appears in binary coded form. Similarly a figure counter 6, having the same number of steps as the position counter 12, has five parallel outputs that contain its instantaneous count in binary coded form. The figure counter 6 tracks the number of transmitted directory-number figures or digit pulse series, respectively. Connected to the outputs of the position counter 12 and the outputs of the figure counter 6 is a five-bit comparator 14 that transmits a comparison pulse to the synchronizing circuit 5 for the duration of each coincidence of the counts of both counters.

An output signal from an AND gate 24, indicating the start of a dialing procedure, is applied to the reset input of the figure counter 6. The same output signal is applied, via an OR gate 16, to a delay line 11 that is in the form of a dynamically triggerable monoflop and introduces the inter-digit interval (or selector hunting time) of 1 second. Connected to the output of the delay line 11 are the stepping input of the figure counter 6 and a preparatory input of the synchronizing circuit 5. This causes the figure counter to be stepped, one second after its resetting, to 1,and, moreover, the synchronizing circuit 5 to be prepared so that it will pass on as a sync pulse the next comparison pulse from the comparator 14. This happens as soon as the position counter 12 has reached the count 1. It is thus ensured that the readout of the directory number from any register 15 starts with the most significant decimal digit or figure of the directory number. The preparation of the synchronization is cancelled by the trailing edge of the passed-on comparison pulse so that a new sync pulse is issued only after a new preparation. The readout and transmission of the second figure of a directory number is initiated by the coincidence pulse from the comparator 7, this pulse being also fed via circuit 16 to the delay line 11, thus causing, after observation of the selector hunting times of 1 second, stepping of the figure counter 6 and the new preparation of the synchronizing circuit 5. When all figures of a directory number have been read out, the shift register 8 no longer receives any signal so that the comparator 7 permanently emits a coincidence signal that continuously stops the dial-pulse generator and is unable to trigger the delay line 11.

For optional generation of the selecting signals applied to the AND gates 17, a stepping interrogator is provided. This is a ring counter 18 having 5 outputs sequentially energized when the ring counter is stepped. The ring counter 18 receives its stepping pulses from a pulse generator operating with the frequency of about 0.5 Hz. This pulse generator 19 can be turned off by the output signal of the AND gate 24 for the duration of the signal. The interrogator also comprises five flip-flops 20 *a* through *e* associated with the registers 15 *a* through *e* on a one-by-one basis. Each flip-flop is invertible by an actuating key 21 *a* through *e* that contains a signal lamp turned on and off by the associated flip-flop and glowing when the flip-flop is set. Each flip-flop 20 has its output connected to an input of an AND gate 22 *a* through *e*, the other input of which is connected to one of the five outputs of the ring counter 18. When an AND gate receives a signal in each of its two inputs, it generates an output signal that is used as a selecting signal and is fed to the AND gate of the associated register 15. A certain register 15 has its content read out, in this way, only when the associated flip-flop 20 is set and the ring counter assumes the counting position associated with this flip-flop.

Connected to the outputs of all AND gates 22 are the inputs of an OR gate 23, the output of which is coupled to an input of the AND gate 24. As a consequence, if all other inputs of the AND gate 24 receive signals, and coincidence is signaled over one of the AND gates 22, the AND gate 24 will generate the output signal that turns off the pulse generator 19, thus interrupting the stepping action of the ring counter 18 and triggering the readout of a directory number and the generation of the corresponding dial-pulse signal as above explained.

Connected to the trunk line 2 via a coupling network 3 is a detector 26 to detect the busy signal of the telephone network. The detector 26 comprises a bandpass filter network tuned to the pitch of the busy signal and further comprises delay networks harmonized to the pulse duration and interval of the busy signal. The detector 26 will transmit a signal to an additional input of the AND gate 24 as long as no busy signal is detected. As soon as a busy signal is detected, the output signal of the detector 26 and the output signal of the AND gate 24 will go negative so that the pulse generator 19 is started to continue the interrogation. Moreover, application of the output signal from the AND gate 24 to the relay selector 30 causes a possibly not yet complete dialing process to be discontinued. Manual stepping of the ring counter 18 with the same consequences can be obtained by operating the actuating key 25 that turns off a voltage normally applied to an additional input of the AND gate 24.

In order to initiate stepping of the ring counter 18 even in case no busy signal is detected, but a called subscriber does not answer within a reasonable period of time, a delay line 27 formed by a monoflop and having a delay time of 40 seconds is provided. The delay line is triggered by the leading edge of the output signal from the AND gate 24. The normally signal-conducting output of the delay line 27 is connected, via an OR gate 28, to a fourth input of the AND gate 24. While the time of the delay line 27 runs, its output signal is interrupted for a short interval, thus also the output signal of the AND gate 24. The then starting stepping of the ring counter 18 causes the previously existing coincidence to be eliminated so that there is no output signal of the AND gate 24 until the next coincidence is reached.

To avoid an interruption of a connection already established with a called subscriber by action of the time-control circuit and delay line 27, a signal existing when the handset of the subscriber station 1 is lifted, is applied to the second input of the OR gate 28 which prevents the negative-going signal across the output of the delay line 27 from becoming effective. The signal indicating a lifted handset is formed in the coupling circuit 3. Moreover, this signal is applied to one of the inputs of five AND gates 29 a through e that are directly connected to the reset input of one of the flip-flops 20. The other input of each AND gate is connected to the output of the ring counter 18 associated with the flop-flop in question. Since the flip-flops 18 are resettable by the trailing edges of signals, that flip-flop which is in coincidence with the ring counter 18 is reset, upon termination of the conversation, by the handset being replaced, thus avoiding another automatic calling of a directory number that had already been part of a successful connection. Of course it is possible to intentionally repeat the dialing of the same directory number by again setting the flip-flop concerned with the aid of the operating or actuating key 21. What is particularly important is the fact that resetting of the flip-flop also causes the ring counter 18 to immediately start again because of the removal of coincidence by replacement of the handset.

Of course the frequency of the pulse generator 19 need not be exactly 0.5 Hz. The frequency of 0.5 Hz controls a minimum interval between the end of a conversation or a dialing and the beginning of a new dialing equal to 2 seconds and therefore, in the case of five registers, a minimum interval of 10 seconds between two selections of the same directory number. These intervals can be changed as required by changing the frequency of the pulse generator 19, e.g. in order to meet technical requirements of the postal authorities.

To inform the user that he may expect the answer of a called subscriber, an amplifier with loudspeaker can be connected to the trunk line 2, but remain turned off during the actual dialing and when the called subscriber is busy. Of course, an optical indicator can be also provided and, for instance, the signal lamps in the push-buttons 21 with flickering light may serve this purpose.

It will be seen that the objects of the invention have been accomplished. The disclosed automatic dialing device overcomes the defects of automatic dialing devices of the prior art. It permits readout of any one of a plurality of stored directory numbers in a rapid and expeditious manner. It automatically steps to another stored number when a call is completed, when the called number results in a busy signal, or when a call is completed.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An automatic calling system for feeding calling signals corresponding to a selected directory number to a communication network including in combination, a plurality of storage registers each adapted to store a representation of a respective directory number, means for generating a series of interrogating signals, selectively actuatable means adapted to be operated to produce selection signals, a plurality of readout means coupled respectively to said storage registers, each of said readout means being responsive to the concomitant presence of one of the respective interrogating signals and one of said selection signals for reading out the register to which the storage means is coupled, means for applying the interrogating signals of said series respectively to said readout means, means for applying said selection signals respectively to said readout means and means responsive to a representation readout of one of said registers by its associated readout means for feeding the corresponding calling signals to said network.

2. A system as in claim 1 including means responsive to actuation of a readout means for deactivating said interrogating signal generating means.

3. A system as in claim 2 including means responsive to a busy signal produced by said communication network for reactivating said interrogating signal generating means.

4. A system as in claim 2 including means responsive to actuation of one of said readout means for reactivating said interrogating signal generating means after a predetermined time delay.

5. A system as in claim 2 including means responsive to a busy signal produced by said communication network for reactivating said interrogating signal generating means and means responsive to actuation of one of said readout means for reactivating said interrogating signal generating means after a predetermined time delay.

6. A system as in claim 5 including manually operable means for reactivating said interrogating signal generating means.

7. A system as in claim 1 in which said interrogating signal generating means comprises a ring counter having a number of output places corresponding to the number of said storage registers, said selection signal producing means comprising respective flip flops corresponding in number to the number of said registers, respective manually operable means for setting said flip flops to produce selection signals and in which said read-out means comprises means for combining the respective ring counter outputs with the selection signals.

8. A system as in claim 7 in which said interrogating signal producing means comprising a pulse generator, means for coupling said pulse generator to said ring counter to step said counter, means responsive to the outputs of said read out means for disabling said coupling means, and means responsive to a busy signal produced by said communication network for reenabling said coupling means.

9. A system as in claim 8 including time delay means responsive to the outputs of said read out means for reenabling said coupling means after a predetermined time.

10. A system as in claim 9 including manually operable means for reenabling said coupling means.

11. A system as in claim 10 including a communication instrument and means responsive to activation of said instrument for initially enabling said coupling means.

12. A system as in claim 1 in which said storage registers store said directory number representations in binary coded decimal form and in which said means responsive to a representation read out of a register comprises means for converting said representation to calling signals in the form of pulse groups, each of which groups includes a number of pulses equal to the called number digit to which the group corresponds.

* * * * *